United States Patent
Kenny et al.

(10) Patent No.: US 11,134,021 B2
(45) Date of Patent: Sep. 28, 2021

(54) TECHNIQUES FOR PROCESSOR QUEUE MANAGEMENT

(71) Applicant: INTEL CORPORATION, Santa Clara, CA (US)

(72) Inventors: Jonathan Kenny, Galway (IE); Niall D. McDonnell, Limerick (IE); Andrew Cunningham, Ennis (IE); Debra Bernstein, Sudbury, MA (US); William G. Burroughs, Macungie, PA (US); Hugh Wilkinson, Newton, MA (US)

(73) Assignee: INTEL CORPORATION, Santa Clara, CA (US)

( * ) Notice: Subject to any disclaimer, the term of this patent is extended or adjusted under 35 U.S.C. 154(b) by 853 days.

(21) Appl. No.: 15/394,488

(22) Filed: Dec. 29, 2016

(65) Prior Publication Data

US 2018/0191630 A1    Jul. 5, 2018

(51) Int. Cl.
*H04L 12/863* (2013.01)
*G06F 13/00* (2006.01)
*H04L 12/801* (2013.01)

(52) U.S. Cl.
CPC .......... *H04L 47/6255* (2013.01); *G06F 13/00* (2013.01); *H04L 47/39* (2013.01)

(58) Field of Classification Search
CPC .... H04L 47/6255; H04L 47/803; H04L 47/39
See application file for complete search history.

(56) References Cited

U.S. PATENT DOCUMENTS

| | | | | |
|---|---|---|---|---|
| 4,272,819 A * | 6/1981 | Katsumata | ............... | G06F 15/17 710/22 |
| 5,519,701 A * | 5/1996 | Colmant | ................. | H04L 29/06 370/412 |
| 6,683,884 B1 * | 1/2004 | Howard | .................. | H04L 47/50 370/412 |
| 6,741,555 B1 * | 5/2004 | Li | ........................... | H04L 47/10 370/229 |
| 7,079,545 B1 * | 7/2006 | Yun | ..................... | H04L 12/5601 370/412 |
| 7,894,347 B1 * | 2/2011 | Anker | ................... | H04L 47/527 370/235 |
| 8,448,156 B2 | 5/2013 | Demetriou et al. | | |

(Continued)

OTHER PUBLICATIONS

"Quality of Service (QoS) Framework", retrieved from <http://dpdk.org/doc/guides-16.04/prog_guide/qos_framework.html>, Sep. 11, 2011, 28 pages (author unknown).

(Continued)

*Primary Examiner* — Tejis Daya
(74) *Attorney, Agent, or Firm* — Kacvinsky Daisak Bluni PLLC

(57) ABSTRACT

Techniques and apparatus for processor queue management are described. In one embodiment, for example, an apparatus to provide queue congestion management assistance may include at least one memory and logic for a queue manager, at least a portion of the logic comprised in hardware coupled to the at least one memory, the logic to determine queue information for at least one queue element (QE) queue storing at least one QE, compare the queue information to at least one queue threshold value, and generate a queue notification responsive to the queue information being outside of the queue threshold value. Other embodiments are described and claimed.

23 Claims, 9 Drawing Sheets

(56) References Cited

U.S. PATENT DOCUMENTS

| | | | |
|---|---|---|---|
| 8,832,713 B2 | 9/2014 | Gould et al. | |
| 9,632,723 B1* | 4/2017 | Gupta | G06F 3/0614 |
| 2002/0131419 A1* | 9/2002 | Tamai | H04L 47/15 |
| | | | 370/395.4 |
| 2003/0154328 A1* | 8/2003 | Henderson | H04L 49/254 |
| | | | 710/1 |
| 2004/0076116 A1* | 4/2004 | Hefty | H04L 47/10 |
| | | | 370/230 |
| 2004/0085322 A1* | 5/2004 | Alcorn | G06T 15/005 |
| | | | 345/562 |
| 2004/0090974 A1* | 5/2004 | Balakrishnan | H04L 47/10 |
| | | | 370/412 |
| 2004/0163084 A1* | 8/2004 | Devadas | H04L 47/10 |
| | | | 718/103 |
| 2005/0018601 A1* | 1/2005 | Kalkunte | H04L 12/5601 |
| | | | 370/229 |
| 2005/0088969 A1* | 4/2005 | Carlsen | H04L 49/30 |
| | | | 370/229 |
| 2005/0201398 A1* | 9/2005 | Naik | H04L 47/6295 |
| | | | 370/412 |
| 2005/0228900 A1* | 10/2005 | Stuart | G06Q 40/025 |
| | | | 709/234 |
| 2006/0050639 A1* | 3/2006 | Stuart | H04L 47/10 |
| | | | 370/235 |
| 2007/0253439 A1* | 11/2007 | Iny | H04L 47/527 |
| | | | 370/413 |
| 2009/0249356 A1* | 10/2009 | He | G06F 9/546 |
| | | | 719/314 |
| 2010/0083273 A1* | 4/2010 | Sihn | G06F 9/5027 |
| | | | 718/104 |
| 2011/0216773 A1* | 9/2011 | Vegesna | H04L 12/56 |
| | | | 370/395.4 |
| 2011/0276732 A1* | 11/2011 | Gewirtz | G06F 9/544 |
| | | | 710/56 |
| 2013/0208593 A1* | 8/2013 | Nandagopal | H04L 47/266 |
| | | | 370/232 |
| 2013/0290984 A1* | 10/2013 | Denio | G06F 9/546 |
| | | | 719/314 |
| 2014/0219287 A1* | 8/2014 | Birke | H04L 47/29 |
| | | | 370/412 |
| 2014/0269274 A1* | 9/2014 | Banavalikar | H04L 47/39 |
| | | | 370/230 |
| 2015/0117230 A1* | 4/2015 | Cui | H04W 48/06 |
| | | | 370/252 |
| 2015/0378796 A1* | 12/2015 | Word | G06F 9/542 |
| | | | 709/203 |
| 2016/0294696 A1* | 10/2016 | Gafni | H04L 49/30 |
| 2017/0060583 A1* | 3/2017 | Hamelin | G06F 9/3836 |
| 2017/0061364 A1* | 3/2017 | Waltz | G06F 16/2453 |

OTHER PUBLICATIONS

Tullberg et al., "Towards the METIS 5G Concepts", retrieved from <https://www.metis2020.com/wp-content/uploads/publications/EuCNC_2014_Tullberg_etal_Towards-the-METIS-5G-Concept.pdf>, Jun. 23-26, 2014, 5 pages.

\* cited by examiner

TECHNIQUES FOR PROCESSOR QUEUE MANAGEMENT

TECHNICAL FIELD

Embodiments herein generally relate to information processing, and more particularly, to managing processor functions using queue management techniques.

BACKGROUND

Computer networks are facilitated by various types of equipment including routers, switches, bridges, gateways, and access points. To support increased demand for networking and cloud computing services, virtualization of computer systems has been implemented to provide services emulated in software. For example, network function virtualization (NFV) may operate to virtualize physical network infrastructure as software components. In general, an NFV may include one or more virtual machines (VMs) being executed on standard network devices, including servers, switches, or other infrastructure components, such that dedicated equipment is not necessary to provide NFV within a network. The VM may function to perform packet processing and forwarding using packet processing threads, distributed workload processes, and/or the like. A VM may queue threads based on priority and ordering requirements. Due to provisioning, application processing, time, and other factors, the queues used by the VMs may back up and create a bottleneck within the network. In addition, delays may cause some packets to go beyond their specified maximum latency requirements (for example, as proposed in the fifth generation (5G) communication technologies) and in turn to go beyond their window of usefulness. If the packets of the queue continue to be consumed, the bottleneck may be exacerbated by increasing the latency of affected packets or applications. Furthermore, if a traffic source continues to enqueue packets, excessive packet congestion may occur. Accordingly, techniques to provide information for network components, including NFV-based network components, to manage packet congestion may benefit network efficiency.

DETAILED DESCRIPTION

Figure 1:
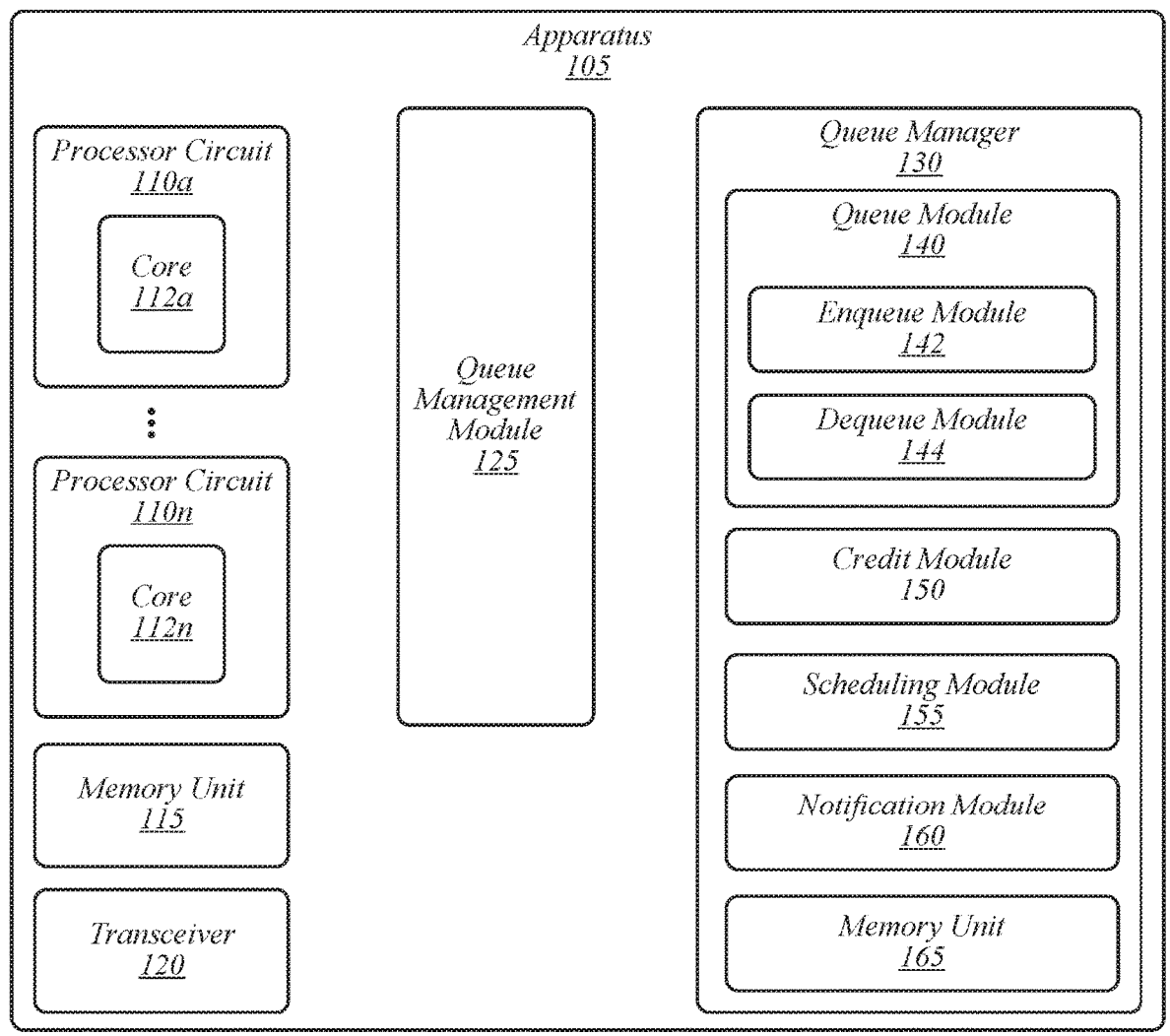
FIG. 1 illustrates an embodiment of a first operating environment.

Various embodiments may be generally directed to techniques for congestion management (or congestion management assistance) within a computing device and/or computer network ("computer system"). The computer system may include a plurality of producers operating to submit queue elements (QEs) to a system component for processing. In various embodiments, the QEs may include data units, packets, threads, pointers (for instance, a pointer to a packet), queueing information, and/or the like. In various embodiments, the system component may include a network component. In some embodiments, the system component may include or may be configured as a queue manager having one or more internal queues ("queues" or "QE queues") for storing QEs (for instance, packets). In some embodiments, the queue manager may be implemented in software, hardware, or some combination thereof. In some embodiments, the queue manager may include a queue management device (QMD) implemented or substantially implemented in hardware. In some embodiments, the queue manager may include a hardware queue manager (HQM) implemented or substantially implemented in hardware. In some embodiments, the queue manager may consist or consist essentially of hardware. In some embodiments, the queue manager may include logic operative to provide functions according to various embodiments. In some embodiments, the logic may comprise hardware. In some embodiments, the logic may consist of or consist essentially of hardware.

The queue manager may store the QEs in QE queues prior to processing of the QEs. Processing of QEs may include, for instance, routing and/or load balancing the QEs (or the work specified by a QE) to one or more consumers. In general, a producer may include any element operative to provide QEs to the system component and a consumer may include any element operative to receive QEs from the system component. In some embodiments, the producers and/or consumers may include processors, processor cores, asset control cores (ACCs), network interface controllers (NICs), virtual machines (VMs), containers, networking devices, software applications, computing devices, servers, computer networks, cloud computing systems, software threads, and/or various other types of hardware and/or software elements capable of submitting QEs to the queue manager.

In some embodiments, each QE queue may be associated with queue information. In general, queue information may generally relate to the status of a QE queue, such as queue length or depth, QE processing time (for instance, time from enqueue to dequeue), QE age, and/or the like. In some embodiments, the queue manager may determine, access, or otherwise obtain one or more queue thresholds. In various embodiments, the queue threshold may include a threshold associated with a characteristic of one or more QE queues and/or the queue manager at processing QEs. Non-limiting examples of a queue threshold may include a number of QEs stored in one or more QE queues (queue length or depth), available space of one or more QE queues, time for QEs to move through a QE queue (for instance, maximum time, average time, mean time, and/or the like), QE age, and/or the like. In some embodiments, the queue threshold may operate as a trigger point to set congestion management (CM) or congestion management indication (CMI) flags ("flags"), for example, responsive to an efficiency parameter exceeding the queue depth threshold. The flags may be communicated to producers and/or consumers. The producers and/or consumers may use the flags to implement congestion management techniques, such as dropping packets, accelerate packet processing, and/or the like. In some embodiments, the flags may be used to indicate congestion, a bottleneck, or other condition that may negatively affect performance. As such, the queue manager may operate according to some embodiments to inform producers and/or consumers about the efficiency of the QE queues to allow the producers and/or consumers to implement congestion management processes as necessary. Accordingly, the queue manager may operate to provide congestion management assistance to, for example, provide information to producers and consumers to allow the producers and consumers to initiate internal congestion management functions.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

FIG. 1 illustrates an example of an operating environment 100 that may be representative of various embodiments. The operating environment 100 depicted in FIG. 1 may include an apparatus 105 having a plurality of processor circuits 110*a-n,* a memory unit 115, and a transceiver 120. Each processor circuit 110*a-n* may include one or more cores 112*a-n*. Although processor circuits 110*a-n* are depicted in FIG. 1 as being contained within apparatus 105, embodiments are not so limited. For example, processor circuits 110*a-n* may be disposed outside of apparatus 105 (for example, in a separate computing device), while processor circuits 110*a-n* and/or the computing devices containing processor circuits 110*a-n* may be communicatively coupled to apparatus 105 (for instance, via transceiver 120). In another example, one or more of processor circuits 110*a-n* may be virtual processor circuits implemented in software or a combination of hardware and software.

As shown in FIG. 1, apparatus 105 may include a queue management module 125. In some embodiments, queue management module 125 may operate as an interface between producers and/or consumers and the queue manager 130. In some embodiments, at least a portion of processor circuits 110*a-n* (or cores 112*a-n*) may be producers and/or consumers. For example, queue management module 125 may be configured to facilitate the delivery or other provisioning of QEs from producers to queue manager 130 and/or from queue manager 130 to consumers. For instance, core 112*a-n,* or another producer/consumer, may execute enqueue and/or dequeue instructions, with queue management module 125 interfacing these instructions with queue manager 130. In some embodiments, queue management module 125 may be implemented in software, hardware, or some combination thereof. In some embodiments, apparatus does not include queue management module 125 (for example, producers and/or consumers may interface directly with queue manager 130). In various embodiments, queue management module 125 may be included in queue manager 130.

Queue manager 130 may be operative to perform congestion management or congestion management assistance. In various embodiments, queue manager may be configured to provide QE processing functions, such as routing, load balancing, scheduling, and/or the like. In various embodiments, queue manager 130 may be implemented in software, hardware, or some combination thereof. In some embodiments, queue manager 130 may be implemented in hardware or substantially entirely in hardware. For example, in some embodiments, queue manager 130 may include a hardware queue manager (HQM) or queue management device (QMD) implemented in hardware or substantially in hardware.

In general, a hardware-based queue manager, such as an HQM, may operate to increase packet processing capabilities of a processor platform, such as an Intel® architecture (IA) platform. Proposed fifth generation (5G) communication technologies may operate to have improved end-to-end latency (for instance, a 5-fold improvement over existing technologoes) and higher data rates (for instance, 10-fold to 100-fold, or even 1000-fold for mobile data) compared to existing systems. A queue manager, such as an HQM, configured according to some embodiments may operate to facilitate data throughput increases by providing congestion management functions efficiently allowing processor platforms, such as an x86 processor platform, to provide lower latency packet processing, for instance, to achieve the latency and data rate goals of 5G systems.

In various embodiments, queue manager 130 may include a memory unit 165 for implementing the QE queues. Accordingly, in some embodiments, the QE queues may be implemented entirely or substantially entirely in hardware. Memory unit 165 may include various suitable types of memory units, including, without limitation, random access memory (RAM), dynamic RAM (DRAM), static RAM (SRAM), and/or the like. In some embodiments, memory unit 165 may include one or more units of SRAM. In some embodiments, memory unit 165 may be configured as a cache memory.

In various embodiments, queue manager 130 may include queue module 140. In general, queue module 140 may operate to facilitate queueing and dequeueing of QEs from the QE queues of memory unit 165. For example, in some embodiments, queue module 140 may include an enqueue module 142 to facilitate placing QEs provided by producers into the QE queues. In another example, according to some embodiments, queue module 140 may include a dequeue module 144 to facilitate removing QEs from the QE queues and providing the QEs to consumers.

In some embodiments, queue manager 130 may include a credit module 150 configured to implement processes for controlling access to resources. In various embodiments, for example, credit module 150 may operate credit processes to allocate a share of resources, such as internal storage (for instance, of memory unit 165 and/or memory unit 115). In some embodiments, a producer may have permission to write (for instance, provide QEs) to a plurality of QE queues. In some embodiments, a producer may check whether there is available credit for submitting a QE. For instance, if a producer submits a QE when no credit is available, the QE (for instance, a packet) may be dropped. In various embodiments, a producer may not have control over which packet(s) are dropped. In general, it may be inefficient to maintain a status, such as a backpressure status, for each QE queue to each producer. Accordingly, in some embodiments, a producer may be aware of the efficiency information or queue information (for example, space availability, queue depth, and/or the like) of the QE queues using the credit processes. In various embodiments, the queue processes may include allocating a share of internal storage for each producer, independent of which QE queues are being used by the producer. In various embodiments, a producer may spend credits for each QE that the producer requests to be processed by the queue manager 130 and, for example, is queued into a QE queue. In some embodiments, a credit may be freed when a QE leaves a QE queue and/or a consumer reads, processes, or otherwise receives a QE.

As shown in FIG. 1, queue manager 130 may include a scheduling module 155. In some embodiments, scheduling module 155 may operate to schedule various functions provided by queue manager. For example, scheduling module 155 may provide scheduling information for various components of queue manager 130 to enqueue QEs into the QE queues, dequeue QEs from the QE queues, process QEs, transmit QEs to consumers, receive QEs from producers, and/or the like. In some embodiments, scheduling module 155 may operate to prioritize the transmission of QEs, packets, and/or the like from producers, consumers, and/or other computing devices communicatively coupled to apparatus 105.

In various embodiments, queue manager 130 may include a notification module 160 operative to provide queue notifications to producers, consumers, and/or any other element or component communicatively coupled to queue manager 130. In various embodiments, the queue notifications may include queue information associated with the status of the QE queues, queue manager 130, and/or components or resources thereof. For instance, the queue notifications may include queue information associated with a queue length or depth of one or more QE queues, such as queue depth for QE queue 1 equals X. In another instance, queue notifications may include a timestamp, for example, for each QE provided to a consumer. In some embodiments, the queue information may be associated with one QE queue. In some embodiments, the queue information may be associated with a plurality of QE queues (for instance, a sum of queue information, such as queue depth, across a plurality of QE queues associated with a producer and/or consumer). In various embodiments, queue notifications may include flags provided to a consumer, for instance, within a QE. In some embodiments, queue notifications may include flags or other data elements provided to a producer in a feedback process. For example, a queue notification may include a flag indicating that the queue depth is outside of a queue threshold. Embodiments are not limited in this context.

In general, conventional packet queue processing systems are implemented in software. In some embodiments, the components of queue manager 130, including queue module 140, credit module 150, scheduling module 155, notification module 160, and/or memory unit 165, may be implemented entirely or substantially entirely in hardware. Accordingly, in various embodiments, a QE queue system may be implemented entirely or substantially entirely in hardware to achieve efficiencies over implementing the same or similar queue systems in software or partially in software. For example, conventional software-managed queues are not able to achieve the performance throughput of a hardware-based queue manager (such as queue manager 130). The ability to provide software-based congestion management may not be available for a conventional hardware-based queue manager without the functionality provided by some embodiments. For instance, conventional software queue management systems require full visibility of internal queue status in order to perform congestion management. However, existing hardware-based queue management systems do not provide the ability to notify producers and/or consumers about various characteristics of the queues, such as queue depth. Implementing congestion management using conventional hardware does not provide the necessary flexibility, adaptability, and/or scalability required for robust and efficient data processing, such as for network function virtualization (NFV) and other virtualization systems, including future network architectures.

Accordingly, some embodiments include a hardware-based queue manager capable of providing producers and/or consumers with feedback necessary for the producers and/or consumers to initiate congestion management. In general, queue manager 105 may be configured to provide queue notifications to allow producers and/or consumers to make congestion management decisions, such as when to drop packets. In some embodiments, the producers and/or consumers may include software (for instance, software-based producers and/or consumers). In some embodiments, the producers and/or consumers may consist of or consist essentially of software. Accordingly, some embodiments may include a hardware-based queue manager capable of providing software with feedback necessary for the software to provide congestion management. For instance, in various embodiments, the queue manager 130 may be configured to provide hardware-based processes for analyzing queue information in view of queue thresholds and to provide queue notifications (for example, flags) to software (for instance, software-based producers and/or consumers). The producers and/or consumers (such as software producers and/or consumers) may use this feedback to carry out congestion management through processes that may be adapted by modifications to the software. In this manner, congestion management flexibility (for instance, responses to indications of congestion by some embodiments) may be retained in software.

Non-limiting examples of congestion management may include "tail drop" actions, "head drop" actions, and/or the like. In general, tail drop actions may include a producer discarding QEs (for instance, packets) rather than adding them to the end of a queue that is known, via a queue notification, to be excessively long. A head drop action may generally include a consumer accelerating processing of QEs (for instance, packets) to ensure that packets in a queue have acceptable latency when being processed by queue module 140. In some embodiments, accelerating processing may include a consumer dropping packets.

In some embodiments, queue manager 130 may provide various forms of congestion management or congestion management assistance to producers and consumers. For instance, a tail drop assist function may include providing queue information to producers regarding a state of individual QE queues. In some embodiments, the queue information may include a length or depth of one or more QE queues. In some embodiments, the queue information may be a specific value of the length of a QE queue (for instance, QE queue length=x). In some embodiments, the queue information may be a flag indicating whether the length of QE queue is greater than (or less than, depending on the configuration of the threshold) a threshold value. In some embodiments, the queue information may be a length-based trigger which can interrupt or be reported as a readable flag. Accordingly, a consumer or producer (for instance, a software consumer or producer) may make a congestion management decision based on the flag (for instance, making a packet drop decision such as via a random early drop mechanism).

In another instance, a head drop assist function may provide information, such as queue information and/or queue notification(s), to a consumer to allow for a determination that the consumer is pulling from a QE queue that exceeds a target length or depth. For example, a consumer pulling QEs from a QE queue that exceeds a target length may mean that the QEs (for instance, packets) at the head of the QE queue have already been in the QE queue for an excessively long time (for example, the QEs are "old"). If the consumer continues to pull QEs from this queue, all QEs pulled from this QE queue may experience high latency, resulting in the associated packets being "out of date" and being dropped at a later point. Accordingly, a more efficient process may provide for a head drop function in which the consumer drops packets from a head portion of the QE queue, thereby sacrificing a small number of packets to keep the overall latency down. Alternatively or in addition, the consumer may operate to accelerate packet processing of the queue.

Figure 2:
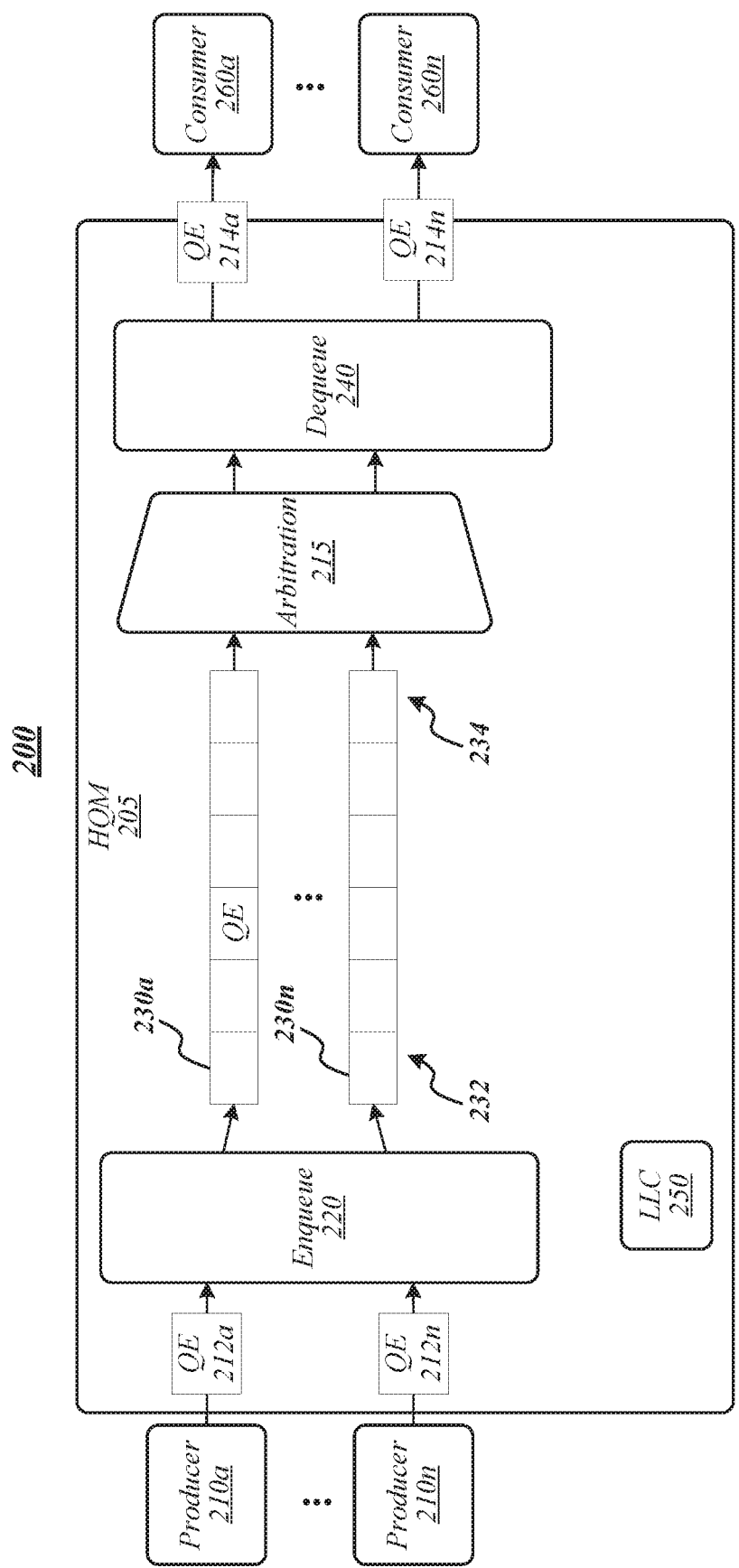
FIG. 2 illustrates an embodiment of a second operating environment.

FIG. 2 illustrates an example of an operating environment 200 that may be representative of various embodiments. The operating environment 200 depicted in FIG. 2 may include a plurality of producers 210a-n operative to write, transmit, or otherwise provide QEs 212a-n to be enqueued 220 to QE queues 230a-n of a hardware queue manager (HQM) 205. In some embodiments, HQM 205 may include one or more memory units, for example, a last level cache (LLC) 250. In various embodiments, HQM 205 may include a hardware-implemented and/or hardware-managed system for queues 230a-n and arbiters. As shown in FIG. 2, QEs may proceed from QE queues 230a-n to arbitration 215. Following arbitration 215, processed QEs 214a-n may be written, transmitted, or otherwise dequeued 240 to corresponding consumers 260a-n.

As shown in FIG. 2, producers 210a-n may enqueue 220 QEs 212a-n to a tail portion 232 of one or more of QE queues 230a-n. In various embodiments, QE queues 230a-n may be implemented in internal memory of HQM 205, such as LLC 250. HQM 205 may dequeue 240 (or "pull") QEs 212a-n (for instance, packets) from a head portion 234 of one or more of the QE queues 230a-n for arbitration 215 and/or provisioning of QEs 214a-n to consumers 260a-n. In some embodiments, QEs 212a-n may be the same as QEs 214a-n (for instance, QE 212a may include a packet provided to a consumer 260a-n as QE 214a). In some embodiments, producers 210a-n and/or consumers 260a-n may include various devices, such as processor cores, NICs, asset control cores, and/or the like. In some embodiments, producers 210a-n and/or consumers 260a-n may include software, such as virtual devices, software threads, and/or the like.

In some embodiments, certain queue information for QE queues 230a-n may be maintained for various purposes, such as arbitration 215 and tracing purposes. Accordingly, programmable queue thresholds may be included within the HQM 205 on a global and/or per queue basis based on system requirements. In addition, in some embodiments, threshold levels may be provisioned separately for producer 210a-n and consumer 260a-n notification. For example, a queue depth threshold may have a first value for a producer 210a-n and a second value for a consumer 260a-n. In various embodiments, threshold levels may be defined, determined, or otherwise generated based on the type of producer 210a-n and/or consumer 260a-n. For instance, a queue depth threshold for a processor core consumer may have a first value, a second value for a NIC, a third value for an ACC, and so on.

Figure 3:
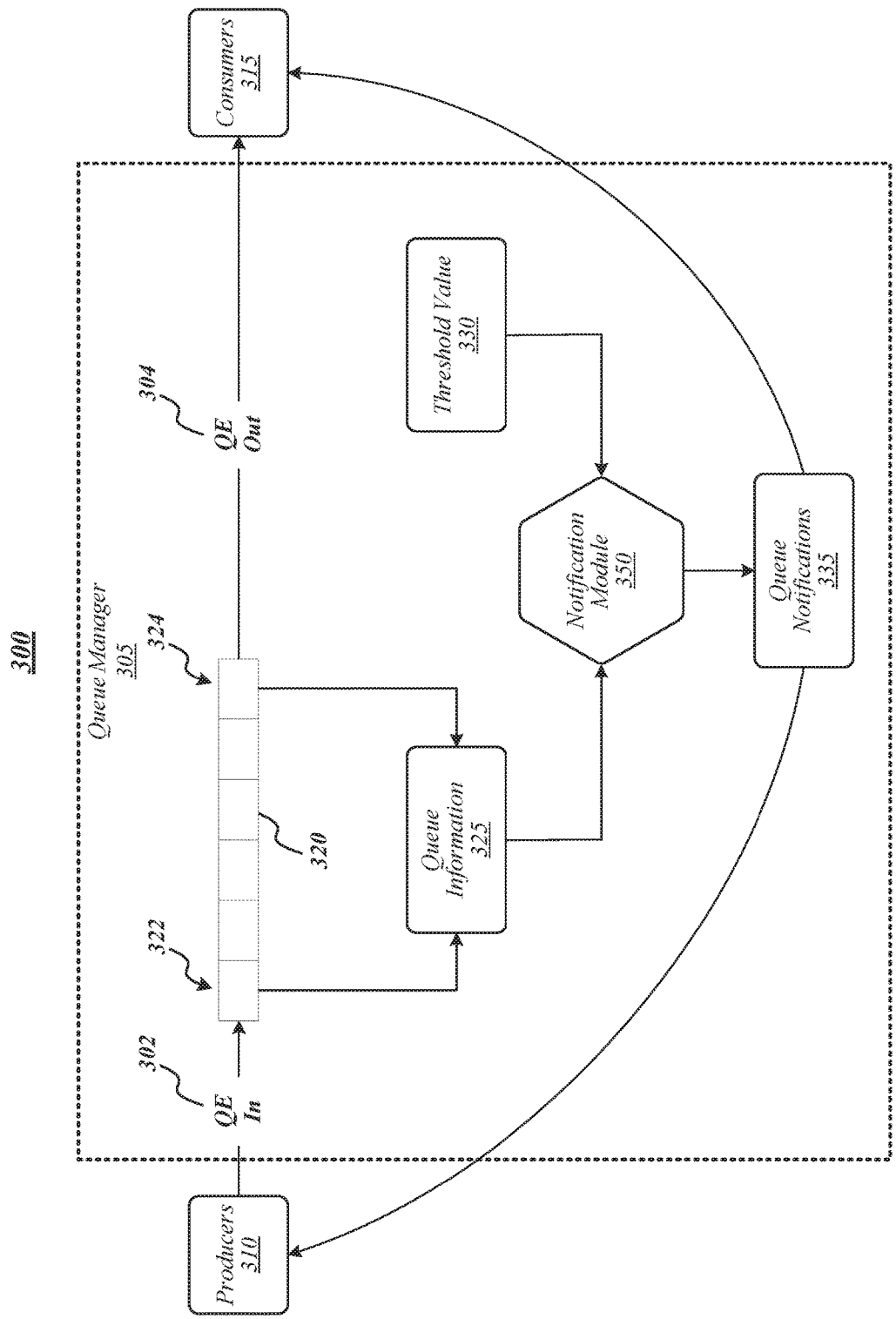
FIG. 3 illustrates an embodiment of a third operating environment.

FIG. 3 illustrates an example of an operating environment 300 that may be representative of various embodiments. The operating environment 300 depicted in FIG. 3 may include a queue manager 305 configured according to some embodiments to receive QEs 302 from producers 310 for placement in the tail portion 322 of a QE queue 320. Although only one QE queue 320 is depicted in FIG. 3, embodiments are not so limited as queue manager 305 may include a plurality of QE queues. In some embodiments, queue manager 305 may be implemented in software, hardware, or some combination thereof. In some embodiments, queue manager 305 may include a hardware queue manager (HQM) or queue management device (QMD) implemented in hardware or substantially in hardware. As shown in FIG. 3, QEs 304 may be dequeued from QE queue 320 and provided to consumers 315.

Queue information 325 may be determined for QE queue 320. For example, queue manager 305 may determine queue information 325 based on information associated with the tail portion 322 and the head portion 324 of QE queue 320, such as a number of QEs in QE queue 320, processing time for a QE (including, for example, average time, mean time, longest time, and/or the like), latency information, QE age, and/or the like. In some embodiments, queue information 325 may be determined by hardware, software, or some combination thereof.

In various embodiments, a threshold value 330 may be determined, defined, or otherwise generated. In some embodiments, threshold value 330 may be associated with queue information, including, without limitation, queue depth, QE processing time, and/or the like. For instance, threshold value 330 may indicate a threshold value of a queue depth of queue 320. In general, threshold value 330 may indicate a condition in which congestion management functions may be required to be initiated by a producer 310 and/or consumer 315 to alleviate a congestion condition for QE queue 320. In some embodiments, threshold value 330 may be determined, defined, or otherwise generated using hardware, software, or some combination thereof.

As shown in FIG. 3, a notification module 350 may be configured to receive, access, or otherwise obtain queue information 325 and/or threshold value 330. In some embodiments, notification module 350 may operate to generate queue notifications 335 based on the queue information and the threshold value 330. For example, threshold value 330 may be determined or defined to be a queue depth of greater than X. Notification module 350 may compare threshold value 330 and generate a queue notification 335 responsive to a queue depth of queue 320 being equal to or greater than X. In some embodiments, queue notifications 335 may in the form of flags, such as congestion management (CM) flags. In various embodiments, queue notifications 335 may include certain notification information, including, without limitation, queue(s) that triggered a queue notification, queue information (for instance, queue depth of triggering queues), functions associated with triggering queues (for instance, which threads are providing QEs to the triggering queue), and/or the like.

In some embodiments, queue notifications 335 may be communicated to producers 310 and/or consumers 315. In various embodiments, queue notifications 335 may be communicated to producers 310 associated with one or more queues 320 having queue information 325 that have triggered a queue notification 335. In some embodiments, queue notifications 335 may be communicated to consumers 315 receiving QEs from one or more queues 320 associated with one or more queues 320 having queue information 325 that have triggered a queue notification 335. In some embodiments, queue notifications 335 may be communicated to producers 310 by writing queue notifications 335 in a memory location accessible by producers. The memory location, for example, may be a memory location periodically checked or otherwise provided to producers 310. In various embodiments, queue notifications 335 may be communicated to consumers 315 by writing queue notifications 335 in QEs delivered to consumers 315.

For example, a first producer may be associated with QE queues 1-100. In some embodiments, certain of QE queues 1-100 may be used for QEs for one or more specific functions (for example, 1-10 for thread A, 11-20 for thread B, and so on). Queues 1-10 may have a queue depth greater than a threshold limit. Accordingly, the first producer may receive a queue notification indicating that a QE queue may have a queue depth greater than the threshold limit. Alternatively or in addition, a consumer receiving QEs, packets, and/or the like from a QE queue triggering a queue notification may receive a queue notification. Accordingly, producers 310 and consumers 315 may operate to implement congestion management (for instance, tail drop actions, head drop actions, and/or the like) responsive to receiving queue notifications 335 according to some embodiments.

Figure 4:
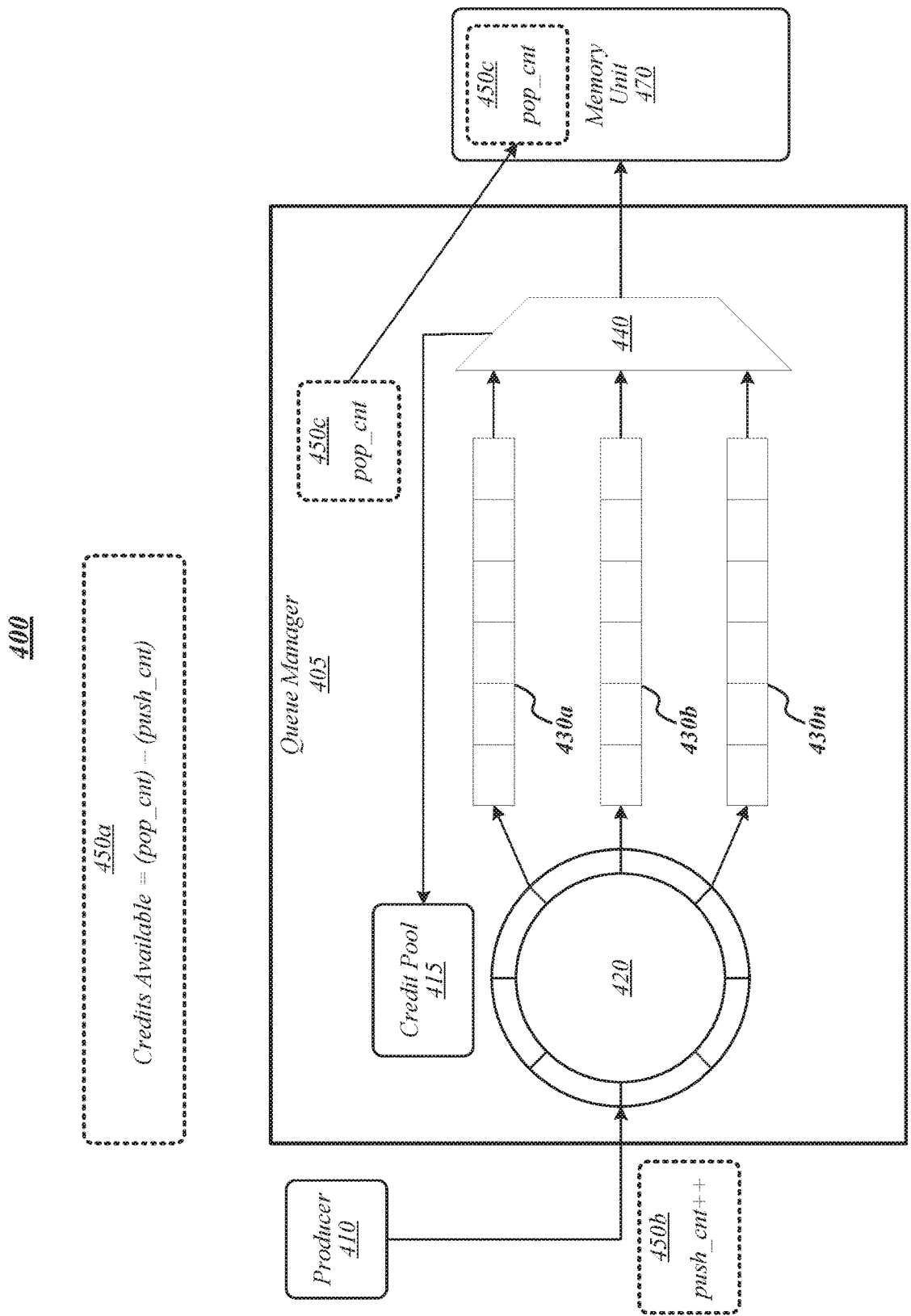
FIG. 4 illustrates an embodiment of a fourth operating environment.

FIG. 4 illustrates an example of an operating environment 400 that may be representative of various embodiments. The operating environment 400 depicted in FIG. 4 may include a queue manager 405 configured to receive QEs (for example, packets from a software thread) from a producer 410, such as a processor core. A memory unit 470 may be included in operating environment 400. In various embodiments, memory unit 470 may include any type of memory capable of operating according to some embodiments, including, without limitation, an LLC and/or other type of cache memory. In various embodiments, memory unit 470 or at least a portion thereof may be disposed within queue manager 405. In various embodiments, memory unit 470 or at least a portion thereof may be disposed outside of queue manager 405, but accessible to queue manager 405. As shown in FIG. 4, producer 410 may provide QEs to be enqueued 420 into QE queues 430*a-n*. In some embodiments, enqueue 420 (and/or dequeue) may be implemented using an enqueue module (such as enqueue module 142). In various embodiments, the enqueue module may operate using a ring structure, for instance, one or more ring arrays (or "rings") implemented in memory. The rings may store data (for instance, QEs) in a first-in-first-out FIFO structure configured to provide the data to queues 430*a-n* on a FIFO bases. In some embodiments, QEs may be enqueued and/or dequeued based on a weight or priority scheme, for example, where certain producers and/or consumers are given priority over other producers and/or consumers.

In some embodiments, a credit management process may be used for controlling access to resources, for example, of queue manager 405 and/or an apparatus associated with queue manager 405. In various embodiments, for example, the credit management process may be used to allocate a share of internal storage (for instance, of memory unit 470, QE queues 430*a-n*, and/or another memory unit). In some embodiments, producer 410 may have permission to write (for instance, provide QEs) to QE queues 430*a-n*. However, it would be inefficient to maintain a status, such as a backpressure status, for each QE queue to each producer. Accordingly, in some embodiments, a producer may be aware of the queue information (for example, space availability, queue depth, and/or the like) of QE queues 430*a-n* using the credit management process. In various embodiments, the credit management process may include allocating a share of internal storage for each producer 410, independent of which QE queues 430*a-n* are being used by producer 410. In various embodiments, producer 410 may spend one or more credits for each QE that producer 410 requests to be processed by queue manager 405 and, for example, is queued into one of QE queues 430*a-n*. In some embodiments, a credit may be freed when a QE leaves (for instance, is dequeued from) a QE queue 430*a-n* and/or a consumer reads, processes, or otherwise receives a QE.

In some embodiments, a credit pool 415 of credits may be maintained, for instance, by queue manager 405. In various embodiments, available credits 450*a* may be determined based on the following process: credits available= (pop_cnt)−(push_cnt). In some embodiments, pop_cnt 450*c* may include an increasing counter or pointer. In some embodiments, pop_cnt 450*c* may include an increasing counter or pointer incremented when a QE is added. In some embodiments, push_cnt 450*b* may include a decreasing counter. In some embodiments, push_cnt 450*b* may include a decreasing counter or pointer decremented when a QE is removed.

In various embodiments, a credit may be freed when a consumer reads a QE and the credits may be returned to a corresponding producer 410 (for instance, in batches at certain time intervals, when a sufficient number of credits becomes available, and/or the like) by the queue manager 405 updating a monotonically increasing pop_cnt 450*c* pointer at a location readable by the producer. In some embodiments, as depicted in FIG. 4, a vector of flags may be written to the same cache line as the credit pointer update (pop_cnt 450*c*) whenever a credit update occurs. Accordingly, maintaining credits for the credit management process and/or giving a flag vector update may not incur extra penalties, for instance, in terms of bandwidth or "cache miss" cost.

Figure 5:
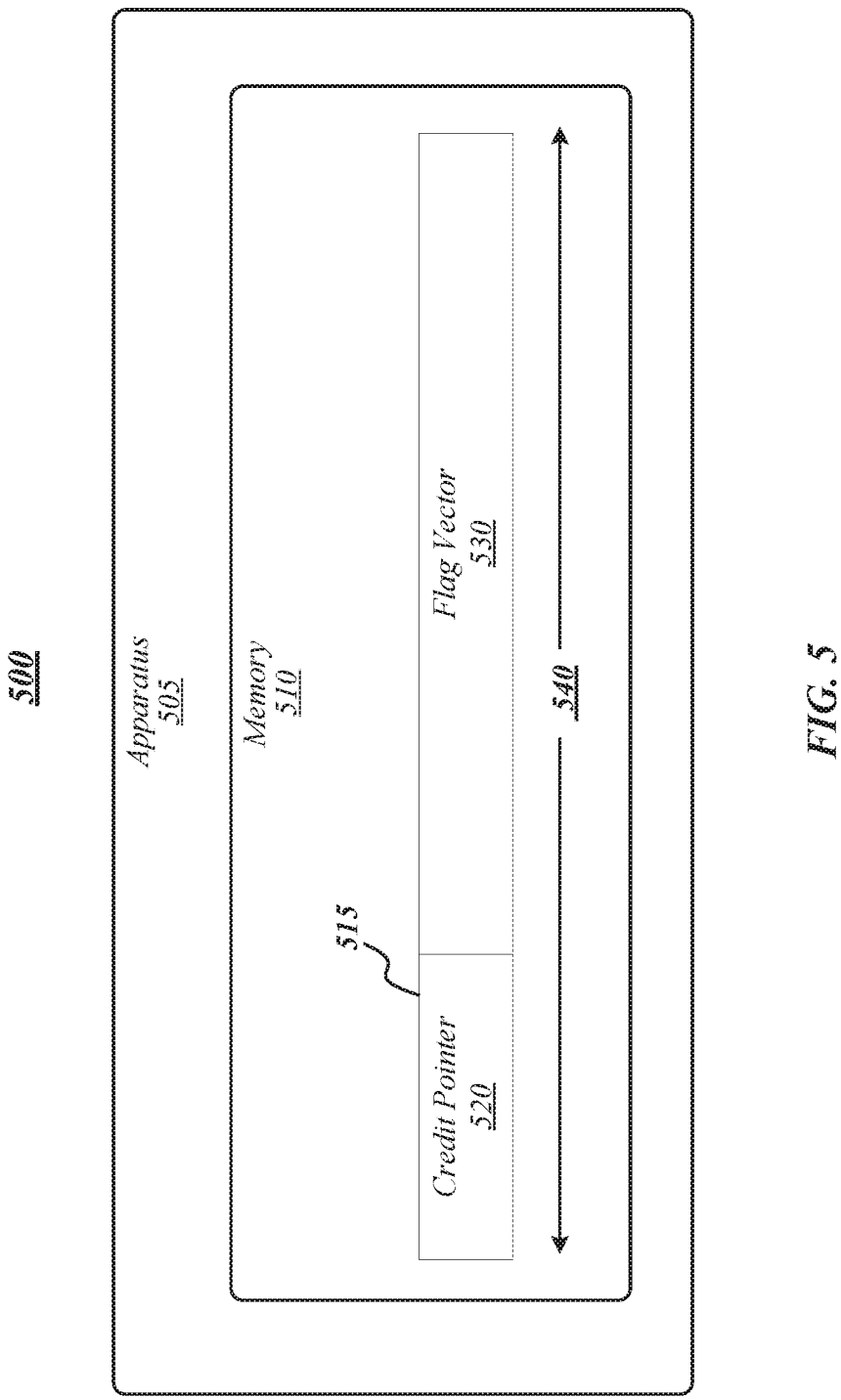
FIG. 5 illustrates an embodiment of a fifth operating environment.

FIG. 5 illustrates an example of an operating environment 500 that may be representative of various embodiments. The operating environment 500 depicted in FIG. 5 may include an apparatus 505 having a memory 510. In some embodiments, memory 510 may include a cache memory, such as an LLC, SRAM, and/or DRAM. In some embodiments, memory 510 may be included within a queue manager, such as queue manager 105, 205, and/or 305. As shown in FIG. 5, a line of memory 515 may be written within the memory 510. In some embodiments, line of memory 515 may include a cache line having a size 540, for example, of 64 bits. In various embodiments, 450 bits or greater may be available in a cache line, which may be sufficient to give, for instance, 2 bits of notification information (for example, a flag state) for up to 128 queues. Cache line 515 may include a credit pointer 520 (for example, pop_cnt) and/or a flag vector 530. Accordingly, in some embodiments, a flag vector 530 may be written to the same cache line as credit pointer 520 (or credit pointer update), for instance, whenever a credit update occurs.

Virtualization of various devices, functions, components, elements, computing devices (for instance, using VMs) and/or the like may be implemented according to some embodiments. For instance, virtualization of queues, such as QE queues may be implemented to provide functions according to some embodiments. In some embodiments, interpretation of a flag vector within a virtualization embodiment may include requiring that a virtual queue identifier (for instance, a QID or unique queue id) be the same identifier as the physical queue assigned to the corresponding VM. Embodiments are not limited in this context.

Figure 6:
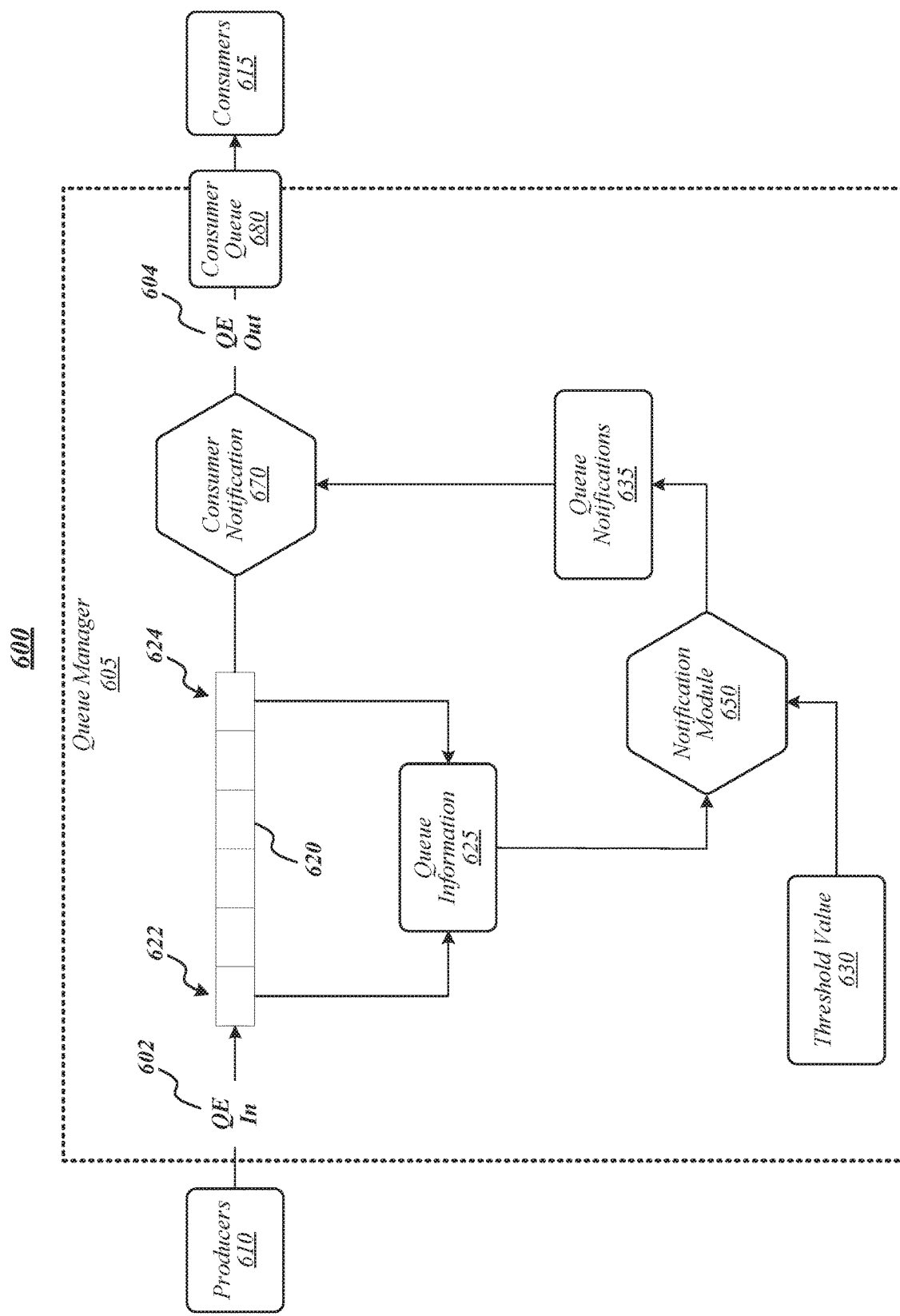
FIG. 6 illustrates an embodiment of a sixth operating environment.

FIG. 6 illustrates an example of an operating environment 600 that may be representative of various embodiments. The operating environment 600 depicted in FIG. 6 may include a queue manager 605 configured according to some embodiments to receive QEs 602 from producers 610 for placement in the tail portion 622 of a QE queue 620. In some embodiments, queue manager 605 may be implemented in software, hardware, or some combination thereof. In some embodiments, queue manager 605 may include a hardware queue manager (HQM) or queue management device (QMD) implemented in hardware or substantially in hardware. As depicted in FIG. 6, QEs 604 may be dequeued from QE queue 620 and provided to consumers 615.

Queue information 625 may be determined for QE queue 620. In some embodiments, queue manager 605 may determine queue information 625 based on information associated with the tail portion 622 and the head portion 624 of QE queue 620, for instance, that indicates a status of QE queue 620, such as the number of QEs in the QE queue 620, processing time for a QE (including, for example, average time, mean time, longest time, and/or the like), latency information, QE age, and/or the like. In some embodiments, queue information 625 may be determined by hardware, software, or some combination thereof.

In various embodiments, a threshold value 630 may be determined, defined, or otherwise created. In some embodiments, threshold value 630 may be associated with queue information, including, without limitation, queue depth, QE processing time, and/or the like. For instance, threshold value 630 may indicate a threshold value of a queue depth of queue 620. In some embodiments, threshold value 630 may be determined, defined, or otherwise generated using hardware, software, or some combination thereof.

As shown in FIG. 6, a notification module 650 may be configured to receive, access, or otherwise obtain queue information 625 and/or threshold value 630. In some embodiments, notification module 650 may operate to generate queue notifications 635 based on the queue information and the threshold value 630. For example, notification module 650 may generate, transmit, or otherwise provide queue notifications responsive to a queue information 625 (for instance, a queue depth) being outside of threshold 630 (for instance, being greater than threshold 630 or vice versa, depending on the particular queue information 625). In some embodiments, queue information 625 may include a queue depth and notification module 650 may operate to generate a queue notification responsive to the queue depth being greater than threshold 630 (for instance, indicating excessive latency for QEs).

In some embodiments, consumers 615 (for instance, software threads) may read QEs from QE queue 620 and/or from a separate consumer queue 680 maintained in memory. As such, consumers 615 may not have visibility into internal QE queues 620 of queue manager 605. Accordingly, in various embodiments, space may be reserved in each QE to include queue notifications 635 to provide consumer notification 670 to consumers 615. In some embodiments, queue notifications 635 may include flags, such as threshold flags. Consumers 615, such as software consumers, may check the threshold flags, for instance, with minimal extra cycle cost. In some embodiments, only about one to two bits may be required for the threshold flags (as compared with a timestamp approach requiring a greater number of bits). In some embodiments, the threshold flags may provide various information regarding queue information, such as "almost empty," "almost full," and/or the like. Consumers 615 may use the threshold flags to infer various characteristics of a queue 620, for instance, whether the queue 620 is growing or is already excessively long. Accordingly, consumers 615 may take appropriate action in response to the threshold flags indicating an excessively lone queue 620, such as dropping packets and/or the like.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 7:
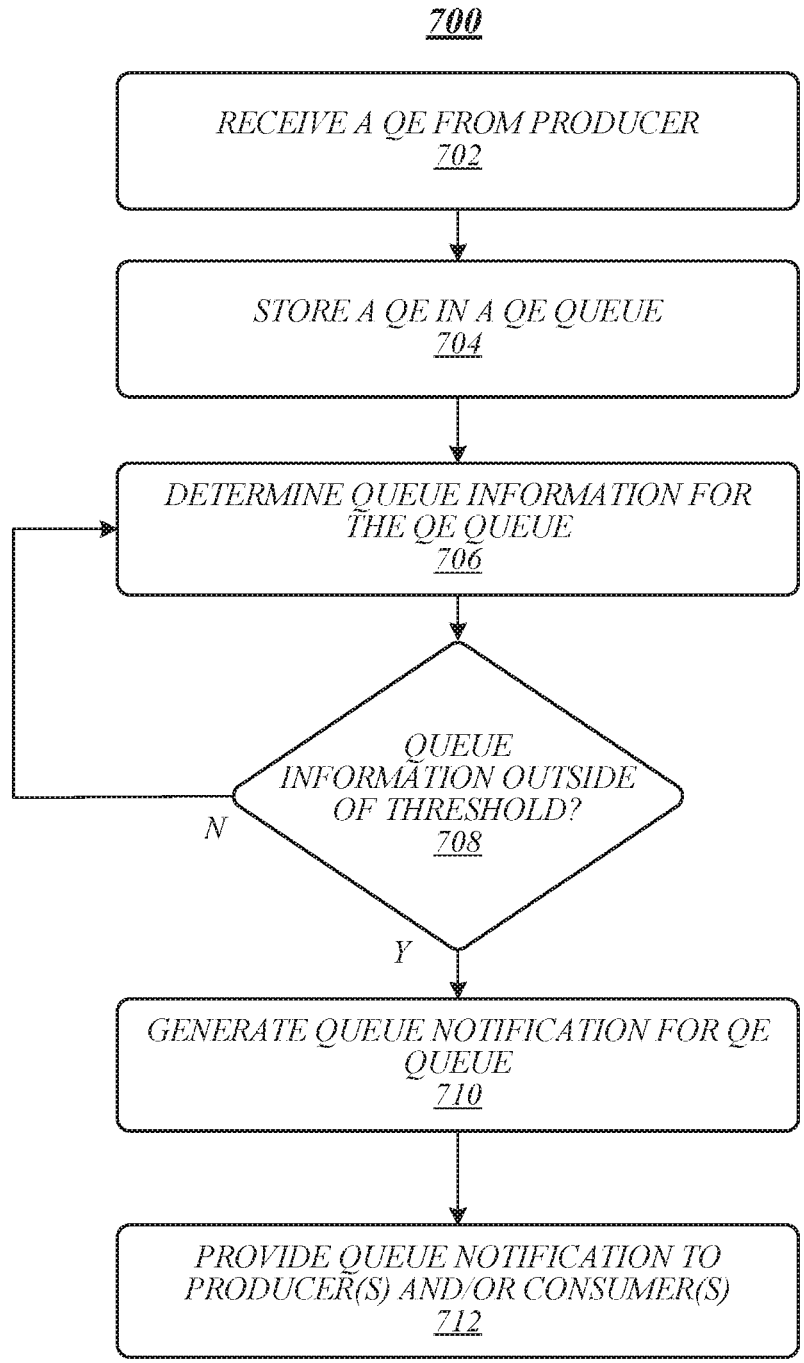
FIG. 7 illustrates an embodiment of a first logic flow.

FIG. 7 illustrates an embodiment of a logic flow 700. The logic flow 700 may be representative of some or all of the operations executed by one or more embodiments described herein, such as queue manager 105, 205, 305, and/or 505.

In the illustrated embodiment shown in FIG. 7, the logic flow 700 at block 702 may receive a QE from a producer. For example, queue manager 305 may receive a QE from producer 310. In general, queue managers, such as queue manager 105, 205, 305, and/or 505, configured according to some embodiments may receive a plurality of QEs from a plurality of producers. At block 704, the logic flow may store the QE in a QE queue. For instance, queue manager 305 may store received QEs 302 in queue 320. In some embodiments, queue manager 305 may include a plurality of QE queues 320.

The logic flow may determine queue information for the QE queue at block 706. For example, queue manager 305 may determine queue information 325 associated with QE queue 320. Non-limiting examples of queue information 325 may include queue length or depth, QE processing time (for instance, time from enqueue to dequeue), QE age, and/or the like. At decision block 708, logic flow 700 may determine whether the queue information is outside of a threshold. For instance, queue manager 305, such as via notification module 350, may access threshold values 330 associated with queue information 325. In a non-limiting example, threshold value 330 may include a queue depth limit and the queue information may include a queue depth for one or more queues. If the logic flow 700 determines that the queue information is outside of the queue threshold (for example, the queue depth of QE queue 320 is greater than (or greater than or equal to) the queue depth limit specified by the queue threshold), a queue notification may be generated for the QE queue at block 710. For instance, queue manager 305, such as via notification module 350, may generate one or more queue notifications 335. In some embodiments, queue notification 335 may include a flag set to indicate that QE queue 320 is outside of the threshold value (for instance, QE queue 320 has a queue depth greater than threshold value 330). In some embodiments, queue notification 335 may include the queue information 325, such as the value of the depth of QE queue 320.

At block 712, logic flow 700 may provide the queue notification to one or more producers and/or consumers. For instance, notification to producers may include queue manager 305 writing a queue notification, such as a vector of flags, to a memory location accessible by producer 310. For notification to consumers, queue manager 305 may reserve space in a QE structure provided to the consumers to include the queue notification 335, such as including notification flags in QEs being sent to a consumer from a QE queue that triggered the queue notification 335.

In some embodiments, queue managers configured according to some embodiments, such as queue managers 105, 205, 305, and/505 may be implemented or substantially implemented in hardware. In addition, components of queue managers may be implemented or substantially implemented in hardware, such as QE queues, notification module, and/or the like. Accordingly, a determination of queue information (for instance, QE queue status) may be executed via hardware without or substantially without the involvement of software or firmware. Furthermore, QE queue status may be provided to software, such as producers and/or consumers such that the software may use the queue information to initiate congestion management when necessary.

Figure 8:
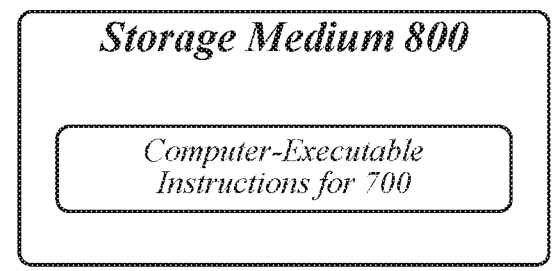
FIG. 8 illustrates an example of a storage medium.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
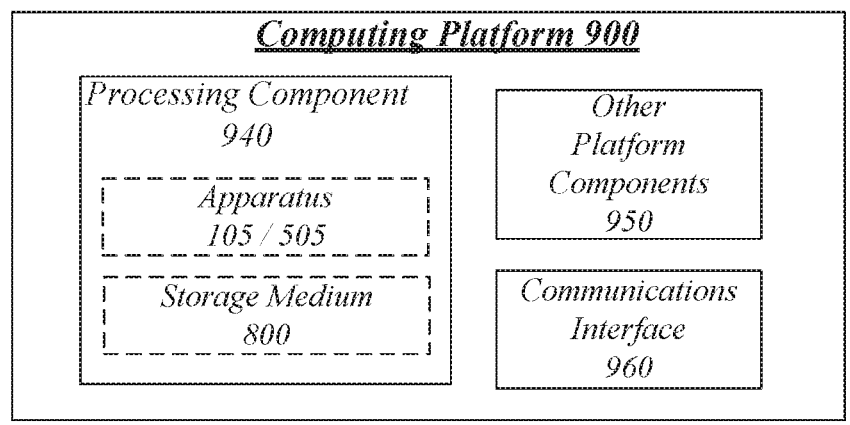
FIG. 9 illustrates an example computing platform.

FIG. 9 illustrates an example computing platform 900. In some examples, as shown in FIG. 9, computing platform 900 may include a processing component 940, other platform components 950 or a communications interface 960. According to some examples, computing platform 900 may be implemented in a computing device such as a server in a system such as a data center. Embodiments are not limited in this context.

According to some examples, processing component 940 may execute processing operations or logic for apparatus 105 or 505 and/or storage medium 800. Processing component 940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 950 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 960 may include logic and/or features to support a communication interface. For these examples, communications interface 960 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 900 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 900 described herein, may be included or omitted in various embodiments of computing platform 900, as suitably desired.

The components and features of computing platform 900 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is an apparatus to provide queue congestion management, the apparatus comprising at least one memory, and logic for a queue manager, at least a portion of the logic comprised in hardware coupled to the at least one memory, the logic to determine queue information for at least one queue element (QE) queue, the at least one QE queue to store at least one QE, compare the queue information to at least one queue threshold value, and generate a queue notification responsive to the queue information being outside of the queue threshold value.

Example 2 is the apparatus of Example 1, the logic to receive the at least one QE from at least one producer.

Example 3 is the apparatus of Example 1, the logic to receive the at least one QE from at least one producer, the at least one producer comprising at least one of a processor, a processor core, a network interface controller (NIC), an asset control core, a virtual machine, a software application, or a software thread.

Example 4 is the apparatus of Example 1, the logic to receive the at least one QE from at least one producer, the at least one producer comprising a software thread.

Example 5 is the apparatus of Example 1, the logic to enqueue the at least one QE received from at least one producer to the at least one QE queue.

Example 6 is the apparatus of Example 1, the logic to provide the at least one QE to at least one consumer.

Example 7 is the apparatus of Example 1, the logic to provide the at least one QE to at least one consumer, the at least one consumer comprising at least one of a processor, a processor core, a network interface controller (NIC), an asset control core, a virtual machine, a software application, or a software thread.

Example 8 is the apparatus of Example 1, the logic to provide the at least one QE to at least one consumer, the at least one consumer comprising a software thread.

Example 9 is the apparatus of Example 1, the logic to dequeue the at least one QE from the at least one QE queue to at least one consumer.

Example 10 is the apparatus of Example 1, the queue manager comprising a hardware queue manager.

Example 11 is the apparatus of Example 1, the queue manager consisting essentially of hardware.

Example 12 is the apparatus of Example 1, the logic consisting essentially of hardware.

Example 13 is the apparatus of Example 1, the queue manager comprising a hardware queue manager, and the logic to provide the at least one queue notification to one of at least one software-based producer or at least one software-based consumer.

Example 14 is the apparatus of Example 1, the queue manager consisting essentially of hardware, and the logic to provide the at least one queue notification to one of at least one producer consisting essentially of software or at least consumer consisting essentially of software.

Example 15 is the apparatus of Example 1, the queue manager comprising at least one queue memory.

Example 16 is the apparatus of Example 1, the queue manager comprising at least one queue memory, the at least one queue implemented in hardware in the at least one queue memory.

Example 17 is the apparatus of Example 1, the queue manager comprising at least one cache memory, the at least one queue implemented in hardware in the at least one cache memory.

Example 18 is the apparatus of Example 1, the at least one QE comprising at least one of a data unit, a packet, a pointer, or a thread.

Example 19 is the apparatus of Example 1, the at least one QE comprising a packet.

Example 20 is the apparatus of Example 1, the at least one QE comprising a pointer.

Example 21 is the apparatus of Example 1, the logic to process the at least one QE to route the at least one QE to the at least one consumer.

Example 22 is the apparatus of Example 1, the logic to process the at least one QE to load balance QEs to a plurality of consumers.

Example 23 is the apparatus of Example 1, the queue information comprising a status of the at least one queue.

Example 24 is the apparatus of Example 1, the queue information comprising at least one of a queue depth, a QE processing time, or a QE age.

Example 25 is the apparatus of Example 1, the queue information comprising a queue depth of the at least one QE queue.

Example 26 is the apparatus of Example 1, the at least one queue threshold comprising at least one of a queue depth, a QE processing time, or a QE age.

Example 27 is the apparatus of Example 1, the at least one queue threshold comprising a queue depth.

Example 28 is the apparatus of Example 1, the logic to provide the queue notification to one of at least one producer or at least one consumer, the queue notification comprising the queue information.

Example 29 is the apparatus of Example 1, the logic to provide the queue notification to one of at least one producer or at least one consumer, the queue notification comprising at least one flag indicating the queue information is outside of the queue threshold.

Example 30 is the apparatus of Example 1, the logic to provide the queue notification to at least one producer via writing the queue notification to a memory location accessible by the at least one producer.

Example 31 is the apparatus of Example 1, the logic to provide the queue notification to at least one producer via writing the queue notification to a memory location accessible by the at least one producer, the queue notification comprising a vector of flags indicating a status of the at least one QE queue.

Example 32 is the apparatus of Example 1, the logic to provide the queue notification to at least one consumer via writing the queue notification in the at least one QE provided to the at least one consumer.

Example 33 is the apparatus of Example 1, the logic to provide the queue notification to at least one consumer via writing the queue notification in the at least one QE provided to the at least one consumer, the queue notification comprising a vector of flags indicating a status of the at least one QE queue.

Example 34 is the apparatus of Example 1, the logic to perform a credit management process for allocating resources to the at least one QE queue.

Example 35 is the apparatus of Example 1, the logic to perform a credit management process for allocating resources to the at least one QE queue, the credit management process comprising writing a credit update to a memory location accessible by at least one producer, and write the queue notification to the memory location.

Example 36 is a system that includes an apparatus according to any of Examples 1 to 35, and at least one radio frequency (RF) transceiver.

Example 37 is a method to provide queue congestion management, the method comprising determining queue information for at least one queue element (QE) queue storing at least one QE, comparing the queue information to at least one queue threshold value, and generating a queue notification responsive to the queue information being outside of the queue threshold value.

Example 38 is the method of Example 37, comprising receiving the at least one QE from at least one producer.

Example 39 is the method of Example 37, comprising receiving the at least one QE from at least one producer, the at least one producer comprising at least one of a processor, a processor core, a network interface controller (NIC), an asset control core, a virtual machine, a software application, or a software thread.

Example 40 is the method of Example 37, comprising receiving the at least one QE from at least one producer, the at least one producer comprising a software thread.

Example 41 is the method of Example 37, comprising enqueuing the at least one QE received from at least one producer to the at least one QE queue.

Example 42 is the method of Example 37, comprising providing the at least one QE to at least one consumer.

Example 43 is the method of Example 37, comprising providing the at least one QE to at least one consumer, the at least one consumer comprising at least one of a processor, a processor core, a network interface controller (NIC), an asset control core, a virtual machine, a software application, or a software thread.

Example 44 is the method of Example 37, comprising providing the at least one QE to at least one consumer, the at least one consumer comprising a software thread.

Example 45 is the method of Example 37, comprising dequeuing the at least one QE from the at least one QE queue to at least one consumer.

Example 46 is the method of Example 37, comprising generating the queue notification via a hardware queue manager.

Example 47 is the method of Example 37, comprising generating the queue notification via a queue manager consisting essentially of hardware.

Example 48 is the method of Example 37, comprising generating the queue notification via a hardware queue manager, and providing the at least one queue notification to one of at least one software-based producer or at least one software-based consumer.

Example 49 is the method of Example 37, comprising generating the queue notification via a queue manager consisting essentially of hardware, and providing the at least one queue notification to one of at least one producer consisting essentially of software or at least consumer consisting essentially of software.

Example 50 is the method of Example 37, comprising providing the at least one QE queue in hardware within at least one queue memory.

Example 51 is the method of Example 37, comprising providing the at least one QE queue in hardware within at least one cache memory Example 52 is the method of Example 37, the at least one QE comprising at least one of a data unit, a packet, a pointer, or a thread.

Example 53 is the method of Example 37, the at least one QE comprising a packet.

Example 54 is the method of Example 37, comprising processing the at least one QE to route the at least one QE to the at least one consumer.

Example 55 is the method of Example 37, comprising processing the at least one QE to load balance QEs to a plurality of consumers.

Example 56 is the method of Example 37, the queue information comprising a status of the at least one queue.

Example 57 is the method of Example 37, the queue information comprising at least one of a queue depth, a QE processing time, or a QE age.

Example 58 is the method of Example 37, the queue information comprising a queue depth of the at least one QE queue.

Example 59 is the method of Example 37, the at least one queue threshold comprising at least one of a queue depth, a QE processing time, or a QE age.

Example 60 is the method of Example 37, the at least one queue threshold comprising a queue depth.

Example 61 is the method of Example 37, comprising providing the queue notification to one of at least one producer or at least one consumer, the queue notification comprising the queue information.

Example 62 is the method of Example 37, comprising providing the queue notification to at least one producer or at least one consumer, the queue notification comprising at least one flag indicating the queue information is outside of the queue threshold.

Example 63 is the method of Example 37, comprising providing the queue notification to at least one producer via writing the queue notification to a memory location accessible by the at least one producer.

Example 64 is the method of Example 37, comprising providing the queue notification to at least one producer via writing the queue notification to a memory location accessible by the at least one producer, the queue notification comprising a vector of flags indicating a status of the at least one QE queue.

Example 65 is the method of Example 37, comprising providing the queue notification to at least one consumer via writing the queue notification in the at least one QE provided to the at least one consumer.

Example 66 is the method of Example 37, comprising providing the queue notification to at least one consumer via writing the queue notification in the at least one QE provided to the at least one consumer, the queue notification comprising a vector of flags indicating a status of the at least one QE queue.

Example 67 is the method of Example 37, comprising performing a credit management process for allocating resources to the at least one QE queue.

Example 68 is the method of Example 37, comprising performing a credit management process for allocating resources to the at least one QE queue, the credit management process comprising writing a credit update to a memory location accessible by at least one producer, and writing the queue notification to the memory location.

Example 69 is a system comprising at least one memory, and logic, at least a portion of which is comprised in hardware coupled to the at least one memory, the logic to perform a method according to any of Examples 37-68.

Example 70 is a computer-readable storage medium that stores instructions for execution by processing circuitry of a computing device to provide queue congestion management, the instructions to cause the computing device to determine queue information for at least one queue element (QE) queue storing at least one QE, compare the queue information to at least one queue threshold value, and generate a queue notification responsive to the queue information being outside of the queue threshold value.

Example 71 is the computer-readable storage medium of Example 70, the instructions to cause the computing device to receive the at least one QE from at least one producer.

Example 72 is the computer-readable storage medium of Example 70, the instructions to cause the computing device to receive the at least one QE from at least one producer, the at least one producer comprising at least one of a processor, a processor core, a network interface controller (NIC), an asset control core, a virtual machine, a software application, or a software thread.

Example 73 is the computer-readable storage medium of Example 70, the instructions to cause the computing device to receive the at least one QE from at least one producer, the at least one producer comprising a software thread.

Example 74 is the computer-readable storage medium of Example 70, the instructions to cause the computing device to enqueue the at least one QE received from at least one producer to the at least one QE queue.

Example 75 is the computer-readable storage medium of Example 70, the instructions to cause the computing device to provide the at least one QE to at least one consumer.

Example 76 is the computer-readable storage medium of Example 70, the instructions to cause the computing device to provide the at least one QE to at least one consumer, the at least one consumer comprising at least one of a processor, a processor core, a network interface controller (NIC), an asset control core, a virtual machine, a software application, or a software thread.

Example 77 is the computer-readable storage medium of Example 70, the instructions to cause the computing device to provide the at least one QE to at least one consumer, the at least one consumer comprising a software thread.

Example 78 is the computer-readable storage medium of Example 70, the instructions to cause the computing device to dequeue the at least one QE from the at least one QE queue to at least one consumer.

Example 79 is the computer-readable storage medium of Example 70, the instructions to cause the computing device to generate the queue notification via a hardware queue manager.

Example 80 is the computer-readable storage medium of Example 70, the instructions to cause the computing device to generate the queue notification via a queue manager consisting essentially of hardware.

Example 81 is the computer-readable storage medium of Example 70, the instructions to cause the computing device to generate the queue notification via a hardware queue manager, and provide the at least one queue notification to one of at least one software-based producer or at least one software-based consumer.

Example 82 is the computer-readable storage medium of Example 70, the instructions to cause the computing device to generate the queue notification via a queue manager consisting essentially of hardware, and provide the at least one queue notification to one of at least one producer consisting essentially of software or at least consumer consisting essentially of software.

Example 83 is the computer-readable storage medium of Example 70, the instructions to cause the computing device to provide the at least one QE queue in hardware within at least one queue memory.

Example 84 is the computer-readable storage medium of Example 70, the instructions to cause the computing device to provide the at least one QE queue in hardware within at least one cache memory Example 85 is the computer-readable storage medium of Example 70, the at least one QE comprising at least one of a data unit, a packet, a pointer, or a thread.

Example 86 is the computer-readable storage medium of Example 70, the at least one QE comprising a packet.

Example 87 is the computer-readable storage medium of Example 70, the instructions to cause the computing device to process the at least one QE to route the at least one QE to the at least one consumer.

Example 88 is the computer-readable storage medium of Example 70, the instructions to cause the computing device to process the at least one QE to load balance QEs to a plurality of consumers.

Example 89 is the computer-readable storage medium of Example 70, the queue information comprising a status of the at least one queue.

Example 90 is the computer-readable storage medium of Example 70, the queue information comprising at least one of a queue depth, a QE processing time, or a QE age.

Example 91 is the computer-readable storage medium of Example 70, the queue information comprising a queue depth of the at least one QE queue.

Example 92 is the computer-readable storage medium of Example 70, the at least one queue threshold comprising at least one of a queue depth, a QE processing time, or a QE age.

Example 93 is the computer-readable storage medium of Example 70, the at least one queue threshold comprising a queue depth.

Example 94 is the computer-readable storage medium of Example 70, the instructions to cause the computing device to provide the queue notification to one of at least one producer or at least one consumer, the queue notification comprising the queue information.

Example 95 is the computer-readable storage medium of Example 70, the instructions to cause the computing device to provide the queue notification to at least one producer or at least one consumer, the queue notification comprising at least one flag indicating the queue information is outside of the queue threshold.

Example 96 is the computer-readable storage medium of Example 70, the instructions to cause the computing device to provide the queue notification to at least one producer via writing the queue notification to a memory location accessible by the at least one producer.

Example 97 is the computer-readable storage medium of Example 70, the instructions to cause the computing device to provide the queue notification to at least one producer via writing the queue notification to a memory location accessible by the at least one producer, the queue notification comprising a vector of flags indicating a status of the at least one QE queue.

Example 98 is the computer-readable storage medium of Example 70, the instructions to cause the computing device to provide the queue notification to at least one consumer via writing the queue notification in the at least one QE provided to the at least one consumer.

Example 99 is the computer-readable storage medium of Example 70, the instructions to cause the computing device to provide the queue notification to at least one consumer via writing the queue notification in the at least one QE provided to the at least one consumer, the queue notification comprising a vector of flags indicating a status of the at least one QE queue.

Example 100 is the computer-readable storage medium of Example 70, the instructions to cause the computing device to receive perform a credit management process for allocating resources to the at least one QE queue.

Example 101 is the apparatus of Example 1, the instructions to cause the computing device to perform a credit management process for allocating resources to the at least one QE queue, the credit management process comprising writing a credit update to a memory location accessible by at least one producer, and write the queue notification to the memory location.

Example 102 is an apparatus to provide queue congestion management, the apparatus comprising a queue status means to determine queue information for at least one queue element (QE) queue, the at least one QE queue to store at least one QE, and a notification means to compare the queue information to at least one queue threshold value, and generate a queue notification responsive to the queue information being outside of the queue threshold value.

Example 103 is the apparatus of Example 102, comprising a receiving means to receive the at least one QE from at least one producer.

Example 104 is the apparatus of Example 102, comprising a receiving means to receive the at least one QE from at least one producer, the at least one producer comprising at least one of a processor, a processor core, a network interface controller (NIC), an asset control core, a virtual machine, a software application, or a software thread.

Example 105 is the apparatus of Example 102, comprising a receiving means to receive the at least one QE from at least one producer, the at least one producer comprising a software thread.

Example 106 is the apparatus of Example 102, comprising an enqueue means to enqueue the at least one QE received from at least one producer to the at least one QE queue.

Example 107 is the apparatus of Example 102, the queue notification means to provide the at least one QE to at least one consumer.

Example 108 is the apparatus of Example 102, the queue notification means to provide the at least one QE to at least one consumer, the at least one consumer comprising at least one of a processor, a processor core, a network interface controller (NIC), an asset control core, a virtual machine, a software application, or a software thread.

Example 109 is the apparatus of Example 102, the queue notification means to provide the at least one QE to at least one consumer, the at least one consumer comprising a software thread.

Example 110 is the apparatus of Example 102, comprising a dequeue means to dequeue the at least one QE from the at least one QE queue to at least one consumer.

Example 111 is the apparatus of Example 102, the notification means comprising a hardware queue manager.

Example 112 is the apparatus of Example 102, the notification means consisting essentially of hardware.

Example 113 is the apparatus of Example 102, comprising at least one queue memory means, the at least one queue implemented in hardware in the at least one queue memory.

Example 114 is the apparatus of Example 102, comprising at least one cache memory means, the at least one queue implemented in hardware in the at least one cache memory.

Example 115 is the apparatus of Example 102, the at least one QE comprising at least one of a data unit, a packet, a pointer, or a thread.

Example 116 is the apparatus of Example 102, the at least one QE comprising a packet.

Example 117 is the apparatus of Example 102, the at least one QE comprising a pointer.

Example 118 is the apparatus of Example 102, comprising a QE processing means to process the at least one QE to route the at least one QE to the at least one consumer.

Example 119 is the apparatus of Example 102, comprising a QE processing means to process the at least one QE to load balance QEs to a plurality of consumers.

Example 120 is the apparatus of Example 102, the queue information comprising a status of the at least one queue.

Example 121 is the apparatus of Example 102, the queue information comprising at least one of a queue depth, a QE processing time, or a QE age.

Example 122 is the apparatus of Example 102, the queue information comprising a queue depth of the at least one QE queue.

Example 123 is the apparatus of Example 102, the at least one queue threshold comprising at least one of a queue depth, a QE processing time, or a QE age.

Example 124 is the apparatus of Example 102, the at least one queue threshold comprising a queue depth.

Example 125 is the apparatus of Example 102, the queue notification means to provide the queue notification to one of at least one producer or at least one consumer, the queue notification comprising the queue information.

Example 126 is the apparatus of Example 102, the queue notification means to provide the queue notification to at least one producer or at least one consumer, the queue notification comprising at least one flag indicating the queue information is outside of the queue threshold.

Example 127 is the apparatus of Example 102, the queue notification means to provide the queue notification to at least one producer via writing the queue notification to a memory location accessible by the at least one producer.

Example 128 is the apparatus of Example 102, the queue notification means to provide the queue notification to at least one producer via writing the queue notification to a memory location accessible by the at least one producer, the queue notification comprising a vector of flags indicating a status of the at least one QE queue.

Example 129 is the apparatus of Example 102, the queue notification means to provide the queue notification to at least one consumer via writing the queue notification in the at least one QE provided to the at least one consumer.

Example 130 is the apparatus of Example 102, the queue notification means to provide the queue notification to at least one consumer via writing the queue notification in the at least one QE provided to the at least one consumer, the queue notification comprising a vector of flags indicating a status of the at least one QE queue.

Example 131 is the apparatus of Example 102, comprising a credit management means to perform a credit management process for allocating resources to the at least one QE queue.

Example 132 is the apparatus of Example 102, comprising a credit management means to perform a credit management process for allocating resources to the at least one QE queue, the credit management process comprising writing a credit update to a memory location accessible by at least one producer, the queue notification means to write the queue notification to the memory location.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus to provide queue congestion management, the apparatus comprising:
    multiple processor cores;
    an interface to memory; and
    circuitry for a queue manager, the circuitry comprised in hardware coupled to the processor cores and the interface to the memory, the circuitry to:
        determine queue information for a first queue element (QE) queue of a plurality of QE queues, the first QE queue to store at least one QE received from a producer processor core of the multiple processor cores,
        decrease a number of credits assigned to the producer processor core,
        compare the queue information to a first queue threshold value of a plurality of queue threshold values, the first QE queue associated with the first queue threshold value, each QE queue associated with a respective queue threshold value,
        generate a queue notification responsive to the queue information and the first queue threshold value,
        cause the queue notification to be written to a memory location in the memory to provide the queue notification to the producer processor core, the producer processor core to read the queue notification from the memory location, and
        provide the queue notification to a consumer processor core of the multiple processor cores.

2. The apparatus of claim 1, each QE queue to store at least one QE, the circuitry to:
    define a new value for the first queue threshold value; and
    store the new value as the first queue threshold value.

3. The apparatus of claim 1, the circuitry to provide the at least one QE stored by the first QE queue to at least one other consumer, the at least one other consumer coupled to the circuitry and to comprise at least one of a processor, a network interface controller (NIC), an asset control core, or a field programmable gate array (FPGA), each consumer of the at least one other consumer associated with a respective queue threshold value of the plurality of queue threshold values, the producer processor core to comprise one of a plurality of producers of a plurality of QEs, each producer of the plurality of producers associated with a respective queue threshold value of the plurality of queue threshold values, the plurality of QEs to include the at least one QE.

4. The apparatus of claim 1, the circuitry further to provide the queue notification to at least one software-based consumer to be executed on the apparatus.

5. The apparatus of claim 1, the circuitry to comprise at least one cache memory, the at least one queue implemented in the at least one cache memory.

6. The apparatus of claim 1, wherein the first queue threshold value is associated with the producer processor core, the circuitry to:
determine queue information for a second QE queue of the plurality of QE queues, the second QE queue to store a second QE received from another producer processor core of the multiple processor cores, the second QE to be consumed by another consumer processor core of the multiple processor cores;
determine a second queue threshold value associated with the another consumer processor core;
compare the queue information for the second QE queue to the second queue threshold value; and
generate a second queue notification responsive to the queue information for the second QE queue and the second queue threshold value.

7. The apparatus of claim 6, the first and second queue threshold values to comprise different values, the at least one QE to comprise at least one of a data unit, a packet, a pointer, or a thread, the queue information to comprise at least one of a queue depth, a QE processing time, or a QE age, the circuitry to:
provide the second queue notification to the another producer processor core and the another consumer processor core.

8. The apparatus of claim 1, the first queue threshold value to comprise at least one of a queue depth, a QE processing time, or a QE age, the queue notification to be generated based on the comparison of the queue information and the first queue threshold value.

9. The apparatus of claim 1, the queue notification to comprise the queue information.

10. The apparatus of claim 9, the queue notification to comprise at least one flag indicating a result of the comparison of the queue information and the first queue threshold value.

11. The apparatus of claim 1, the circuitry to provide the queue notification to the consumer processor core via a write of the queue notification in the at least one QE provided to the consumer processor core.

12. The apparatus of claim 1, the number of credits assigned to the producer processor core to control access to the first QE queue by the producer processor core, the number of credits assigned to the producer processor core based on: (i) a number of QEs written to the first QE queue by the producer processor core, and (ii) a number of QEs written to the first QE queue by the producer processor core and read by the consumer processor core.

13. The apparatus of claim 12, the circuitry to:
write a credit update to reflect the decreased number of credits assigned to the producer processor core to the memory location in the memory accessible by the producer processor core.

14. A method to perform queue congestion management, the method comprising:
determining, by circuitry, queue information for a first queue element (QE) queue of a plurality of QE queues, the first QE queue to store at least one QE received from a producer processor core of multiple processor cores coupled to the circuitry;
decreasing, by the circuitry, a number of credits assigned to the producer processor core;
comparing, by the circuitry, the queue information to a first queue threshold value of a plurality of queue threshold values, the first QE queue associated with the first queue threshold value, each QE queue associated with a respective queue threshold value;
generating, by the circuitry, a queue notification responsive to the queue information and the first queue threshold value;
writing, by the circuitry, the queue notification to a memory location in a memory to provide the queue notification to the producer processor core, the producer processor core to read the queue notification from the memory location; and
providing, by the circuitry, the queue notification to a consumer processor core of the multiple processor cores.

15. The method of claim 14, the at least one QE comprising at least one of a data unit, a packet, a pointer, or a thread, each QE queue to store at least one QE, the method further comprising:
defining a new value for the first queue threshold value; and
storing the new value as the first queue threshold value.

16. The method of claim 14, the queue information comprising at least one of a QE processing time, or a QE age.

17. The method of claim 14, the first queue threshold value comprising at least one of a queue depth, a QE processing time, or a QE age, the queue notification generated based on the comparison of the queue information and the first queue threshold value.

18. The method of claim 14, further comprising providing the queue notification to at least one other consumer, the queue notification comprising the queue information, each consumer of the at least one other consumer associated with a respective queue threshold value of the plurality of queue threshold values, the producer processor core comprising one of a plurality of producers of a plurality of QEs, each producer of the plurality of producers associated with a respective queue threshold value of the plurality of queue threshold values, the plurality of QEs to include the at least one QE.

19. The method of claim 14, the queue notification comprising at least one flag indicating a result of the comparison of the queue information and the first queue threshold value.

20. The method of claim 14, comprising providing the queue notification to the consumer processor core via writing the queue notification in the at least one QE provided to the consumer processor core.

21. A non-transitory computer-readable storage medium that stores instructions for execution by processing circuitry for queue congestion management, the instructions to cause the circuitry to:

determine queue information for a first queue element (QE) queue of a plurality of QE queues, the first QE queue to store at least one QE received from a producer processor core of multiple processor cores coupled to the circuitry;

decrease a number of credits assigned to the producer processor core;

compare the queue information to a first queue threshold value of a plurality of queue threshold values, the first QE queue associated with the first queue threshold value, each QE queue associated with a respective queue threshold value;

generate a queue notification responsive to the queue information and the first queue threshold value;

write the queue notification to a memory location in a memory to provide the queue notification to the producer processor core, the producer processor core to read the queue notification from the memory location; and provide the queue notification to a consumer processor core of the multiple processor cores.

22. The computer-readable storage medium of claim 21, storing instructions to cause the circuitry to:

define a new value for the first queue threshold value; and store the new value as the first queue threshold value.

23. The computer-readable storage medium of claim 21, the instructions to cause the circuitry to provide the queue notification to at least one other consumer via a write of the queue notification in the at least one QE provided to the at least one other consumer, each consumer of the at least one other consumer associated with a respective queue threshold value of the plurality of queue threshold values, the producer processor core comprising one of a plurality of producers of a plurality of QEs, each producer of the plurality of producers associated with a respective queue threshold value of the plurality of queue threshold values, the plurality of QEs to include the at least one QE.

* * * * *